William D. Marsh  Ronald C. Hoke
Francis S. Pramuk  Charles W. Skarstrom   Inventors By Robert I. Pearlman
Patent Attorney William D. Marsh
Francis S. Pramuk
Ronald C. Hoke
Charles W. Skarstrom
Inventors By Robert J. Pearlman
Patent Attorney 3,142,547
PRESSURE EQUALIZATION DEPRESSURING IN HEATLESS ADSORPTION
William D. Marsh, Netcong, Francis S. Pramuk, Fanwood, Ronald C. Hoke, Berkeley Heights, and Charles W. Skarstrom, Montvale, N.J., assignors to Esso Research and Engineering Company, a corporation of Delaware
Filed Dec. 18, 1961, Ser. No. 160,197
10 Claims. (Cl. 55—26)

The present invention is concerned with an improved method for fractionating multicomponent mixtures in the vapor phase. More specifically, the present invention is concerned with an improved process wherein a multicomponent feed stream is fractionated in the vapor phase, into a stream relatively free of a key component or components present in the feed stream and a stream relatively enriched in the key component or components. In its most specific aspects, the present invention is concerned with an improved process for fractionating a multicomponent feed stream in the vapor phase, into a stream relatively free of a key component or components present in the feed stream, and a stream relatively enriched in the key component or components using the technique of adsorption at a relatively high pressure and desorption at a relatively low pressure.

A method of fractionating a multicomponent vapor stream into a stream relatively free of a key component or components, present in the feed stream, and a stream relatively enriched in the key component or components by adsorption at a relatively high pressure and desorption at a relatively low pressure is known to the art. This process is set out in Skarstrom's patent, U.S. 2,944,627. In fractionating vapor streams, an adsorbent is selected which has an affinity for the key component or components. The key component or components are generally the less desirable components in the feed stream and are separated from the more desirable component or components. Two beds of adsorbent are used. The feed stream is passed through the first of the two beds at high pressure wherein the key component or components are selectively adsorbed on the adsorbent. As the feed stream flows through the bed, a concentration gradient appears. The adsorbent at the feed inlet adsorbs the key components until the partial pressure of the key components in the feed stream is equal to the vapor pressure of the key components on the adsorbent. When this equilibrium condition is reached on the adsorbent at the feed inlet, the adsorption of key components occurs on the adsorbent farther down the bed. In this manner the concentration gradient of the key component passes down the adsorbent bed until the concentration gradient reaches the end of the adsorbent bed. At this point, it will be noted that the key components break through into the primary effluent stream. Therefore, in order to obtain a stream relatively free of the key components, the adsorption step is carried out for a period of time just less then that required for the vapor pressure of the key components on the adsorbent to become equal to the partial pressure of the key components in the feed stream. In other words, the key components are not allowed to break through into the primary effluent steram in substantial quantities. The stream relatively free of the key component or components is hereinafter referred to as the primary effluent, while the stream relatively rich in the key component is referred to as the secondary effluent.

While the feed stream is being passed through the first bed at high pressure, the key components are being desorbed from the adsorbent in the second bed. This desorption process is generally carried out by first lowering the pressure at the feed inlet end of the bed to some preselected pressure thus allowing the trapped vapor to backwash the adsorbent. It will be noted that some desorption occurs in the depressuring step as a result of this backwash.

The adsorbent bed is then purged with a portion of the primary effluent from the feed outlet end to the feed inlet end. With the adsorbent relatively saturated with key components and the purge relatively free of the key components, there is a driving force present which tends to bring key components from the adsorbent into the purge stream. The concentration gradient of the key components in the adsorbent bed is thus swept back toward the feed inlet end of the bed.

Finally, the adsorbent bed is repressured with a portion of the primary effluent to a pressure substantially equal to the adsorption pressure.

These two beds are then switched, the first from adsorption to desorption and the second from desorption to adsorption. Thus, it may be seen that the process contemplates a cyclic operation wherein one bed is on the adsorption portion of the cycle and the other is on the desorption portion of the cycle. The cycle length is the period of time elapsing from the time a given bed is put first on the adsorption portion of the cycle, then on the desorption portion of the cycle, and is finally put back on the adsorption portion of the cycle. The cycle length is not necessarily the adsorption and desorption of one bed since the time required for the desorption portion of the cycle is not necessarily equal to the length of time of the adsorption portion of the cycle.

It has been found that the technique of heatless fractionation is a very efficient process for separating multicomponent mixture streams in the vapor phase. However, in the desorption portion of the cycle, a considerable quantity of the desirable component is lost in the depressuring and purging steps. When the adsorbent bed is depressured that portion of the desired component present in the feed stream which is trapped in the adsorbent bed passes out with the secondary effluent. Also, when the adsorbent bed is purged with a portion of the primary effluent, that portion of the primary effluent thus used also passes out in the secondary effluent stream. Thus, there is a considerable loss of the more desirable component.

It should also be noted that when extremely small cycle lengths are used, the adsorbent beds are desorbed frequently and thus the recovery of the more desirable component from the feed stream becomes quite low. These difficulties can be overcome, to a certain extent, by depressuring the bed and then purging it at as low a pressure as is feasible. By depressuring and purging at a low pressure, which is below atmospheric pressure in some cases, the volume of the depressuring and purging gases is maximized. However, even if the depressuring and purging pressure is minimized, there is still a considerable loss of the more desirable component which passes out with the secondary effluent.

Thus, it is an object of the present invention to provide a method whereby the depressuring gas is used to backwash the adsorbent bed in such a way that the recovery of the more desirable component is greatly improved without sacrificing the purity of the more desirable component in the primary effluent.

This object of the invention is accomplished in one embodiment by initially depressuring the adsorbent bed at the primary effluent end to some pressure intermediate the high adsorption pressure and the low desorption pressure. The pressure is then reduced to the desorption pressure at the feed inlet end of the adsorbent bed and the total depressuring gases are then passed in reverse flow through the adsorbent bed. Thus, the resulting volume of the depressuring gases passed over the adsorbent in the bed is considerably greater than if the depressuring were conducted by merely reducing the pressure at the feed inlet end of the bed.

In the preferred embodiment of the present invention, the adsorbent is initially depressured at the primary effluent end to some pressure intermediate the high adsorption pressure and the low desorption pressure. The adsorbent bed is then isolated from the depressuring gas stream which passed out the primary effluent end of the bed. The adsorbent bed is depressured from the feed inlet end to the preselected low desorption pressure. After the bed has reached the low desorption pressure, the bed is then backwashed at the low desorption pressure, from the primary effluent end to the feed inlet end, with the depressuring gas stream from the initial depressuring step. By using the methods above described, a more efficient use of the depressuring gas is obtained than has heretofore been known to the art. A twofold benefit accrues by depressuring in this manner. The first and most obvious benefit arises from the fact that a larger volume of depressuring gas passes over the whole length of the adsorbent bed.

When the bed is depressured using the prior art technique, the volume of gas passing over the feed outlet end of the bed is substantially nil. However, using the process of the present invention a large volume of gas passes over the whole length of the adsorbent bed. The volume of gas passed over the bed depends upon the intermediate pressure and the final desorption pressure.

The other, less obvious benefit arises as a result of the key component concentration gradient existing in the adsorbent bed. The concentration of key component is the greatest at the feed inlet and least at the outlet. Furthermore, as previously noted, feed is passed through the adsorbent bed on the adsorption portion of the cycle until key component appears in the primary effluent.

Thus when the bed is depressured at the primary effluent end, the depressuring gases are extremely rich in the more desirable component. In fact, the composition of this depressuring gas does not differ appreciably in composition from that of the primary effluent. When this gas is then used to backwash the bed at the low depressuring pressure it is very similar to, and has the same effect as, the purge step in the prior art heatless fractionating process.

It is thus possible, in the process of the present invention to reduce, and in some cases eliminate the purge of the adsorbent beds.

While the process of the present invention represents an improvement in any process wherein the heatless fractionating technique is used, its effect is especially pronounced in the heatless fractionating process adapted for the purification of hydrogen.

Hydrogen is present in substantial quantities in many refinery streams. In particular, the make gas from a catalytic reformer generally contains hydrogen in a concentration ranging from 35 to 85 mol percent. However, along with the hydrogen is a mixture of hydrocarbon compounds. Hydrocarbon compounds having from 1 to 5 carbon atoms predominate in this mixture. However, there are trace quantities of hydrocarbon compounds having from 6 to 10 carbon atoms. The adsorbent used to separate hydrogen from a stream containing hydrogen and hydrocarbon compounds has a stronger affinity for the hydrocarbon compounds than it has for hydrogen. The hydrocarbon compounds are thus the key components.

In fractional distillation there is the concept known as relative volatility. In fractional distillation it is desired to fractionate a multicomponent mixture stream into two streams, an overhead product and a bottoms product. The heaviest desirable component in the overhead is called the light key and the lightest desirable component in the bottoms is the heavy key. The ratio of the fugacity of the light key to that of the heavy key is called the relative volatility of the key components and determines the fractionation requirements. Generally speaking, the greater the difference between the boiling points of the key components the greater is the relative volatility and the easier they are to separate by fractional distillation. There are analogous concepts in the process of vapor phase heatless fractionation. It appears that the heavier hydrocarbon compounds have a greater affinity for an activated carbon adsorbent than do the lighter hydrocarbon compounds. Thus, it is much easier to separate hydrogen from pentane than it is from methane. This, however, has the accompanying disadvantage that the heavier hydrocarbon compounds are more difficultly desorbable from the adsorbent than are the lighter hydrocarbons. The $C_6$ to $C_{10}$ hydrocarbon compounds tend to be retained by the adsorbent even through the normal depressuring and purging sequence. The adsorption capacity of the adsorbent tends to decline. Therefore, it is within the scope of the present invention to provide a process wherein the capacity of the adsorbent declines at a much slower rate than with hydrogen purification processes currently known to the art.

The invention and its objects will be more fully understood in the following description when read in light of and with reference to the accompanying drawings.

Figure 1:
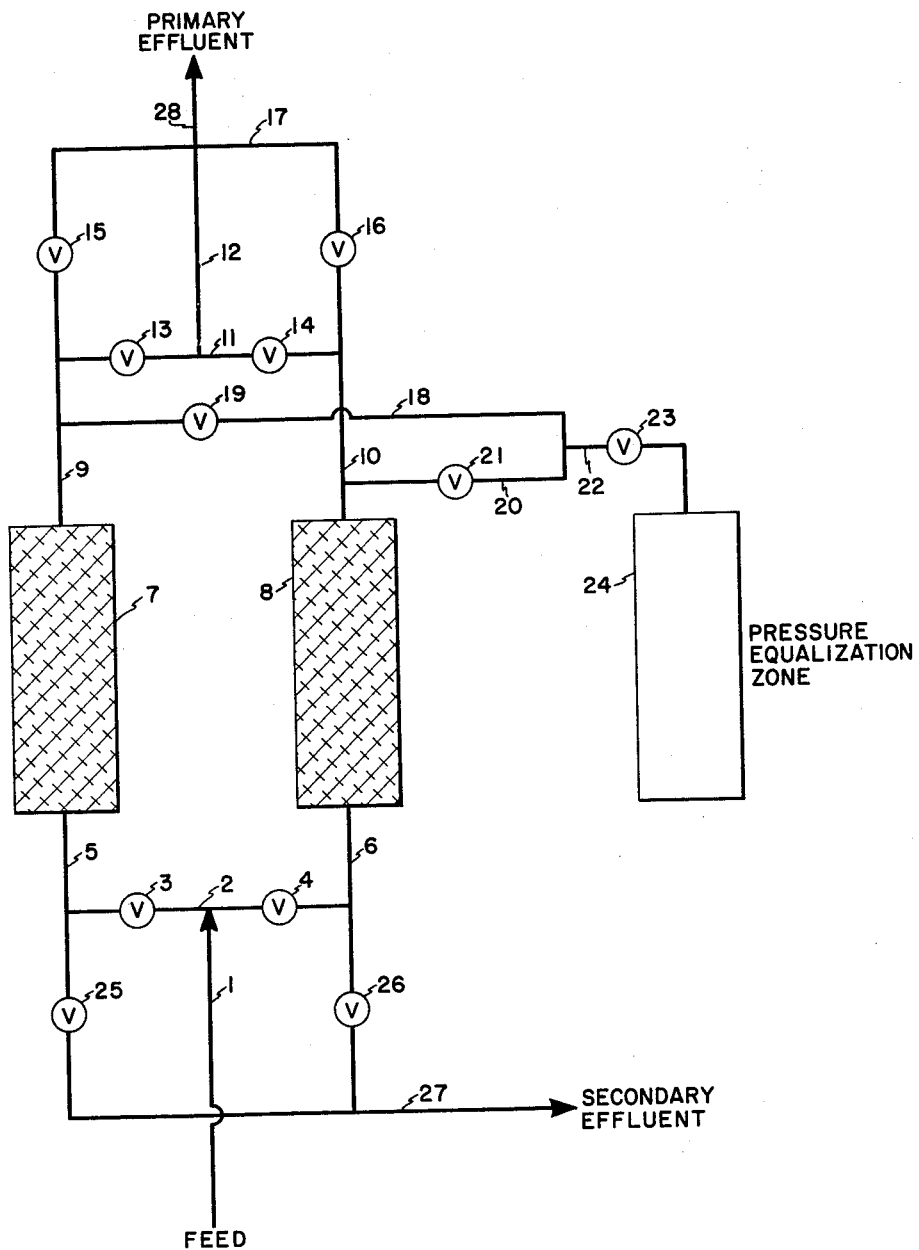
FIGURE 1 is a flowplan of the process of the present invention.

Referring now to FIGURE 1 in more detail, numeral 1 designates the vapor feed stream inlet line. The feed is a vapor stream consisting of the more desirable component or components and the key components.

The temperature of the feed stream is the temperature at which the fractionating process is conducted. However, this does not necessarily mean that the fractionation process occurs at ambient temperature. It is within the scope of the invention that the feed is heated to some temperature above, or cooled to some temperature below the ambient temperature.

The essential requirements with respect to temperature or the adsorbent must be selective for the key component or components at the adsorption temperature and that the feed stream is in the vapor phase at the adsorption temperature.

It should be noted that the heatless fractionation process is one wherein the key components are desorbed from the adsorbent without the addition of extraneous heat to the system. This limitation, as previously pointed out, does not require that the process be carried out at ambient temperature.

The vapor feed stream line 1, passes into header 2, through valve 4 into line 6 and into adsorption zone 8. Valve 3 which is also in header 2 is closed so that the vapor feed stream passes through open valve 4 as indicated. Adsorption zone 8, and similarly, adsorption zone 7, is a vessel packed with an adsorbent which is selective for the key component or components. Numerous adsorbents are known to the art which exhibit an affinity for a compound or class of compounds over some other compound or class of compounds. Some of these adsorbents include activated carbon, alumina, silica gel, glass wool, adsorbent cotton and molecular sieves. Various metal oxides, clays, fuller's earth, bone char, etc. also exhibit absorbent characteristics and may be utilized in adsorption zones 7 and 8 to perform separations of a preselected nature.

As has been previously stated when one zone is on the adsorption portion of the cycle, the other zone is on the desorption portion of the cycle. Thus, with the feed stream passing to adsorption zone 8, as thus described, adsorption zone 8 is on the adsorption portion of the cycle.

The temperature of adsorption zone 8 may be at, above, or below that of the ambient. If it is sought to operate adsorption zone 8 at a temperature above or below that of the ambient, adsorption zone 8 is heated or cooled by any suitable means. The temperature selected is the optimum adsorption temperature with a given feed stream and adsorbent. The temperature at which to operate adsorption zones 7 and 8 can be readily determined by one skilled in the particular art.

The adsorption portion of the cycle is carried out at a relatively high pressure. The adsorption pressure in adsorption zone 8 is generally in the range of 5 to 700 p.s.i.g. It is to be noted that the adsorption pressure depends, to some extent, on the temperature. Since this is a vapor phase fractionation process, the pressure will be limited by the temperature at which the adsorption takes place. The temperature selection is rested on the adsorption characteristics existing between the key components and the adsorbent.

As the feed is passed through adsorption zone 8, the key component or components are adsorbed on the adsorbent packed in zone 8. The stream leaving zone 8 through line 10 is the primary effluent. The primary effluent is rich in the more desirable component or components present in the feed stream. It is thus relatively free of the key component or components. The primary effluent, line 10, passes through valve 16 and into header 17 and out line 28. In order for the primary effluent to take the path described, valves 14, 13, 21 and 15 are closed.

The primary effluent passing out line 28 may be compressed and stored or sent directly to some other processing unit wherein it is used.

As has been previously stated, when one zone is on the adsorption portion of the cycle, the other zone is on the desorption portion of the cycle. Thus, for the purposes of this description it is assumed that zone 7 has just been on the adsorption portion of the cycle, and that the adsorbent is relatively saturated with the key component or components. Zone 7 is thus on the desorption portion of the cycle.

At the beginning of the desorption sequence, valves 19 and 23 are opened to bring adsorption zone 7 and pressure equalization zone 24 into communication with each other. The vapor trapped in adsorption zone 7 passes into pressure equalization zone 24 to bring the two zones to the same pressure.

Pressure equalization zone 24 may be any vessel or drum capable of containing the vapor stream depressured into it. The size of pressure equalization zone 24 depends on the size of adsorption zone 7 and the equilibrium pressure sought to be attained between the two zones.

It may be seen that the larger the size of adsorption zone 7, the greater will be the quantity of vapor trapped therein at the end of the adsorption portion of the cycle, and the larger pressure equalization zone 24 will have to be to obtain a given equilibrium pressure level. The size of adsorption zone 7, and also adsorption zone 8, depends on the quantity of adsorbent required. In general, no hard and fast rule can be set down to determine the quantity of adsorbent required for a given fractionation operation.

There are a number of factors which influence the adsorbent requirements, and thus the size of adsorption zones 7 and 8.

First of all, the cycle length affects the adsorbent requirements. The shorter the cycle, the less is the quantity of adsorbent required for a given feed rate. However, it should be noted that the shorter the cycle length, the lower will be the recovery of the more desirable component or components from the feed stream. This is due to the fact that the shorter the cycle length, the more frequently will the desorption portion of the cycle occur, and the more often will the adsorbent be purged with a portion of the primary effluent. Thus, while the absorbent requirement is reduced by shorter cycle lengths, the percent recovery of the more desirable component or components in the feed stream also decreases.

Furthermore, there is a physical limitation on how fast adsorption zones 7 and 8 can be switched from adsorption to desorption and vice versa. It often develops that the time required for desorption will set the cycle length.

Cycle lengths of from 10 seconds to 40 minutes are employed. The cycle lengths must remain short enough so that the heat of adsorption is retained within the adsorbent bed, thus making this heat available when the key components are desorbed.

Another factor which influences the quantity of adsorbent required is the feed rate. At a given cycle length, the greater the feed rate, the greater is the quantity of adsorbent required.

Still another factor is the amount of the key component or components in the feed. It is known that an adsorbent, selective for a component, can generally adsorb only from 5 to 50 percent of its weight of the component. This is at static conditions wherein the component is passed over the adsorbent until the adsorbent becomes saturated with the component. However, at the dynamic conditions employed in the heatless fractionation process, the adsorbent is capable of adsorbing $\frac{1}{20}$ to $\frac{3}{4}$ the quantity of the component that it can adsorb at static conditions.

As a result, the greater the amount of key component in the feed, the greater will be the quantity of adsorbent required at a given feed rate.

Finally, the temperature and pressure at which the adsorption occurs effects the quantity of adsorbent required at a given feed rate, cycle length, and feed composition.

In general, the static capacity, and thus the dynamic capacity, of the adsorbent for a key component or components, decreases as the temperature of adsorption increases. The effect of pressure, while not as pronounced, has the opposite effect. That is, as the pressure increases so does the capacity of the adsorbent.

As a general rule, the quantity of adsorbent required in adsorption zones 7 and 8 must be sufficient so that at the minimum cycle length, as determinetd by the physical limitations of switching valves, depressuring, purging and repressuring, etc., the desired purity of primary effluent is obtained. That is, if substantially pure primary effluent is desired, substantially no key component is allowed to break through into the primary effluent stream.

Returning now to the size of pressure equalization zone 24, as stated before, this is determined by the desired equilibrium pressure level in adsorption zone 7 and pressure equalization zone 24. The manner of determining the size of pressure equalization zone 24 will be discussed in detail later.

In the preferred embodiment of the present invention, after the pressure levels in adsorption zone 7 and pressure equalization zone 24 have become substantially equal, valve 19 is closed. Valve 25 is then opened and adsorption zone 7 is depressured to the desorption pressure. The desorption pressure is, of necessity, lower than the adsorption pressure. During the depressuring, a portion of the adsorbed components are removed from the adsorbent. When valve 25 is opened the vapor passes into line 5 through valve 25 into header 27 where it is disposed of by any suitable means as secondary effluent. Vacuum facilities are used to evacuate adsorption zone 7 to a desorption pressure below atmospheric pressure. On the other hand, it is not imperative that the desorption pressure be below atmospheric pressure. As stated previously, the desorption pressure is below the adsorption pressure and is limited to this extent.

After adsorption zone 7 has been completely depressured, valve 19 is opened and the vapor in pressure equalization zone 24 passes through line 22, valve 23 and into line 18, through valve 19, into line 9 and into adsorption zone 7 where the adsorbent is backwashed with this vapor. This vapor emanating from pressure equalization zone 24, backwashes adsorption zone 7, and passes out as the above-mentioned secondary effluent through line 5, valve 25 and header 27 where it may be disposed of as previously described.

Valve 23 is a flow control means whereby the rate of flow of vapor from and to adsorption zone 7 is regulated to minimize attrition of the adsorbent. Valve 23, however, is not necessary in the present invention and need not limit its scope.

Valve 19 is then closed and adsorption zone 7 is purged at the low desorption pressure with a portion of the primary effluent.

Valve 13 is opened and a portion of the primary effluent in line 28 passes into line 12, header 11, through valve 13, into line 9 and adsorption zone 7 where the adsorbent therein is backwashed with a portion of the primary effluent.

This vapor purge stream passes through adsorption zone 7, line 5, valve 25, into header 27 and is withdrawn as secondary effluent. It is also desirable to control the flow rate of the purge stream through adsorption zone 7 to minimize attrition of the adsorbent therein.

The primary effluent purge sweeps the key component concentration gradient toward the feed inlet end of adsorption zone 7.

The volume of purge used to purge adsorption zone 7 is that volume which will sweep the key component concentration gradient as far toward the feed inlet end of adsorption zone 7 as it will be swept toward the primary effluent end during the adsorption portion of the cycle. It may thus be visualized that the key component concentration gradient is given an oscillating movement. During the adsorption portion of the cycle it is swept toward the primary effluent end of adsorption zone 7. During the desorption portion of the cycle it is swept toward the feed inlet end.

Using the process of the present invention, the quantity of purge required is much less than with the prior art heatless fractionation process. This aspect will be covered in detail later.

Another embodiment of the present invention utilizes pressure equalization zone 24 in a slightly different manner.

In this instance after valve 19 has been opened to allow the pressure levels in adsorption zone 7 and pressure equalization zone 24 to come to equilibrium valve 25 is opened and the expanded depressuring vapor then backwashes adsorption zone 7. This depressuring vapor stream is then withdrawn as secondary effluent from header 27. Primary effluent purge is introduced as set out above.

Figure 2:
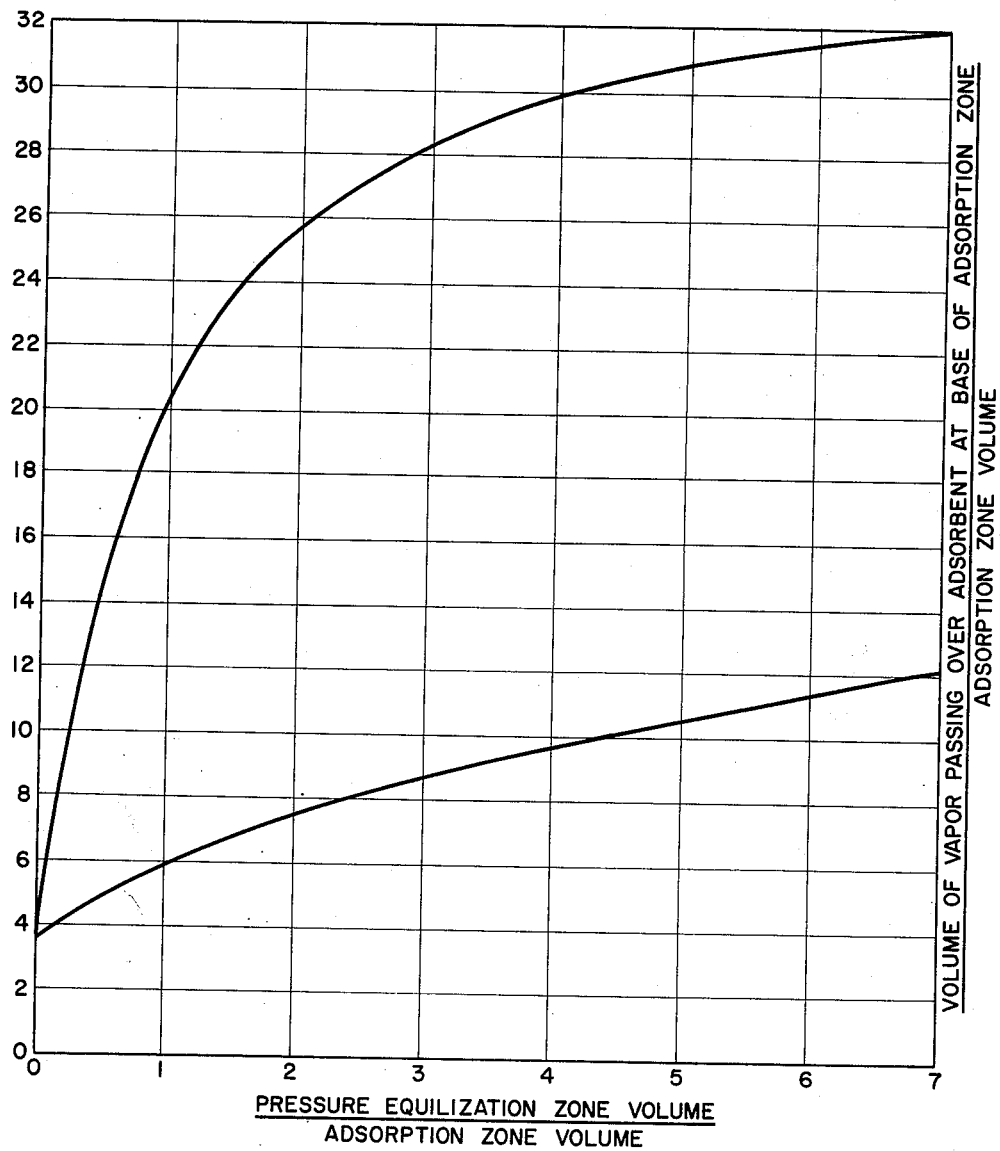
FIGURE 2 illustrates graphically the additional volume of vapor passed through the adsorption zone using the depressuring process of the present invention.

FIGURE 2 illustrates graphically the volumetric increase in adsorption zone backwash during the depressuring step with both embodiments of the present invention. In FIGURE 2 the ordinates of the graph are a numerical representation of the ratio of the volume of vapor passing over the feed inlet end of the bed to the volume of the adsorption zone. The abscissas express the ratio of the pressure equalization zone volume to the adsorption zone volume.

The upper curve illustrates the effect of the preferred embodiment of the present invention wherein the adsorption zone is first placed in communication with the pressure equalization zone, then isolated from the pressure equalization zone, depressured to the low desorption pressure and finally placed in communication with the pressure equalization zone so that the vapor from the pressure equalization zone backwashes the adsorption zone at the low desorption pressure. The lower curve illustrates the effect of another embodiment of the present invention wherein the adsorption zone is placed in communication with the pressure equalization zone and the two zones, while in communication with each other, are then depressured to the low desorption pressure.

It will be appreciated that the very nature of the two methods of depressuring the adsorption zone gives rise to a larger increase in the volume of the depressuring gases in the preferred embodiment of the present invention than in the other embodiment. As compared to the prior art heatless fractionators in which the adsorption zones are depressured from the feed inlet end of the zone, both embodiments of the present invention give a significant increase in the volume of the depressuring gases passing through the zone. The significance of this is that the additional volume of the depressuring gases passing through the zone gives rise to a situation wherein the subsequent purge volume can be decreased.

As it has been previously pointed out, the purge in the heatless fractionation process brings about a loss in the recovery of the more desirable components from the feed stream. Therefore, any reduction in volume of purge will bring about an increased recovery of the more desirable components from the feed. By using the depressuring method of the present invention with the pressure equalization zone, the volume of purge required to purge the adsorption zone can be significantly decreased.

The size of the pressure equalization zone depends on the desired intermediate equilibrium pressure between the adsorption zone and the pressure equalization zone. The variation in the composition of the depressuring gases with the intermediate equilibrium pressure will be pointed out in more detail later.

In general, it may be said that the lower the intermediate equilibrium pressure the closer will the composition of the depressuring gases approach that of the feed stream. Of course, essentially no benefit is obtained by passing a vapor stream back through the adsorption zone which has a composition substantially the same as that of the feed. Therefore, in selecting the intermediate equilibrium pressure for any given vapor fractionation service, an optimum exists wherein the maximum benefit from the depressuring gases is obtained. It will be appreciated that one skilled in this particular art can arrive at the optimum intermediate equilibrium pressure which exists for a given separation. It will be pointed out in more detail later how this optimum intermediate equilibrium pressure can be determined, for example, in the situation of hydrogen purification from a hydrogen-hydrocarbon mixture stream wherein the hydrocarbon compounds have from 1 to 10 carbon atoms. However, the present invention is aplicable to any heatless fractionation process, such as the separation of oxygen from air, nitrogen from air, or, for instance, water vapor from air.

Referring once more to FIGURE 2, it may be noted that the prior art heatless fractionators have a pressure equalization zone volume of zero. At this value the ratio of the volume of vapor passing over the feed inlet end of the adsorption zone to the volume of the adsorption zone is about 3.5. Both embodiments of the present invention increase the volume of vapor passing through the adsorption zone.

It should be noted that with either embodiment of the present invention the intermediate pressure level to which the adsorption zone is first depressured must be greater than the desorption pressure. Thus, the volume of the pressure equalization zone is limited to that volume which will yield an equilibrium pressure intermediate to the adsorption and desorption pressures.

The data for FIGURE 2 apply at an adsorption pressure of 500 p.s.i.g. and a desorption pressure of 0 p.s.i.g.

Referring again to FIGURE 1, it may be seen that after adsorption zone 7 has been purged with a portion of the primary effluent, line 28, valve 25 in line 5 is closed and adsorption zone 7 is repressured with primary effluent, line 28. The primary effluent, line 28, passes through line 12 to header 11, through valve 13 and line 9 to adsorption zone 7. When the pressure in adsorption zone 7 substantially reaches the high adsorption pressure, valve 13 is closed and adsorption zone 7 is ready to be put on the adsorption portion of the cycle.

It will be noted that the process of the present invention has been described with adsorption zone 8 on the adsorption portion of the cycle and zone 7 on the desorption portion of the cycle. The embodiment of the heatless fractionation process of FIGURE 1 is a cyclic process. Thus, when the key component or components break through adsorption zone 8 in such quantities that the purity of the primary effluent leaving adsorption zone 8 through line 10 falls below the desired level, adsorption zone 8 is then taken off the adsorption portion of the cycle and put on the desorption portion of the cycle. Adsorption zone 7 is taken off the desorption portion of the cycle and put on the adsorption portion of the cycle. Adsorption zone 8 is switched from adsorption to desorption by closing valves 4 and 16 and opening valve 21. Adsorption zone 7 is switched from desorption to adsorption by opening valves 3 and 15. Valves 25, 13 and 19 are closed so that the feed flows into and the primary effluent flows out of adsorption zone 7. The primary effluent flows from adsorption zone 7 in line 9 through valve 15 into header 17 and out through line 28 where it may be disposed of as previously described.

It has been previously stated that in purging the adsorption zones with primary effluent the key component concentration gradient is swept as far back toward the feed inlet end of the zone as it had been swept forward toward the primary effluent end of the zone during the adsorption portion of the cycle. While this general statement is true with respect to most heatless fractionation processes such as the purification of oxygen, argon or nitrogen from air, and also the drying of air or other gaseous streams, a peculiar situation exists in the purification of hydrogen from a stream containing hydrogen and a mixture of hydrocarbon compounds. The heavier hydrocarbon compounds, having from 6 to 10 carbon atoms, are very difficultly desorbable from the adsorbent, which is activated carbon. As a result, when using the optimum purge volume, which is about one volume of purge per volume of feed, the capacity of the adsorbent declines due to the adsorption of the heavier hydrocarbon compounds thereon. Thus, with a given feed composition and rate, the capacity of the adsorbent declines with time on stream. This capacity decline can, however, be offset by increasing the volume of purge during the desorption step. The purge volume can be increased by reducing the low desorption pressure and/or increasing the quantity of purge passed through the adsorption zone. There are physical limitations with respect to pressure reduction so the other alternative is to increase the purge rate. The adsorption zone is purged with a portion of the primary effluent. Increasing the purge rate, therefore, decreases the quantity of product recovered from the feed stream.

Figure 3:
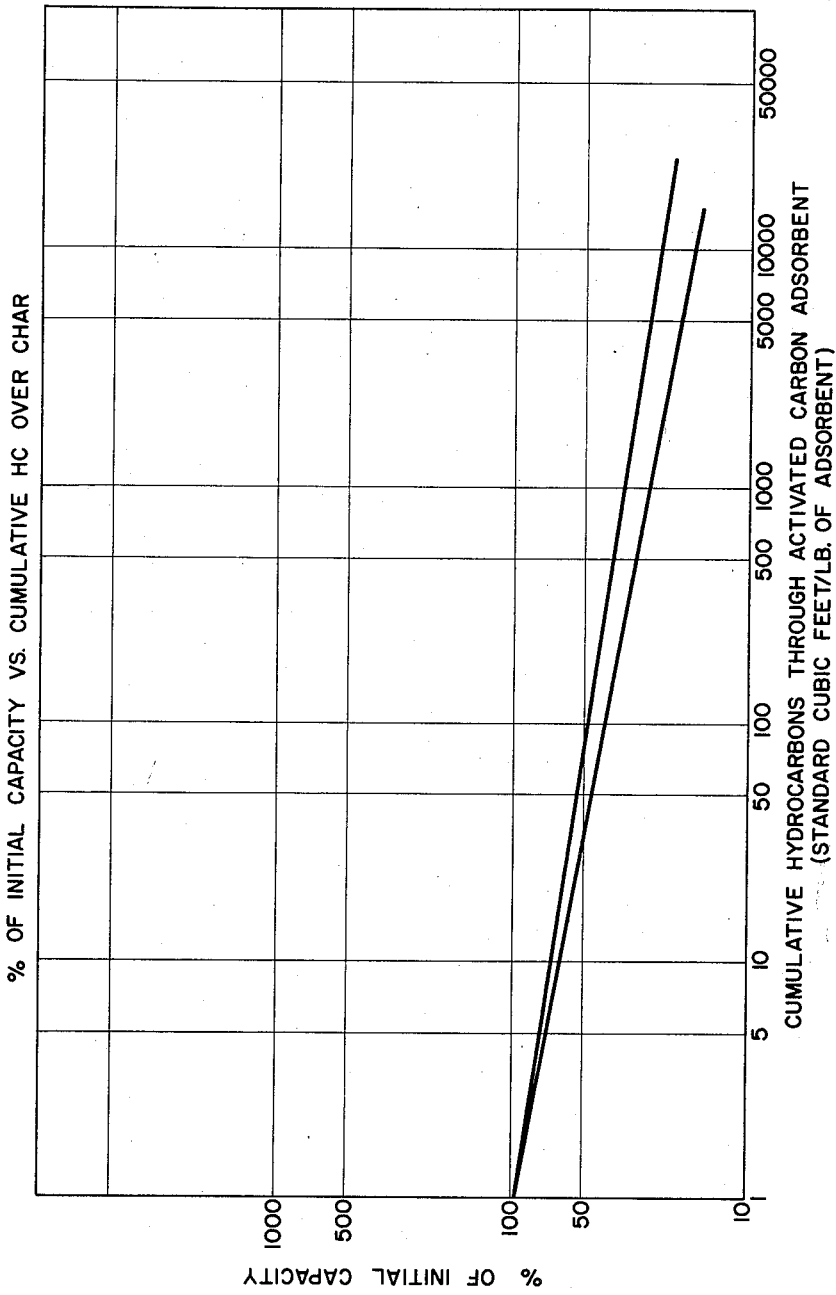
FIGURE 3 illustrates graphically the lower adsorbent capacity decline associated with the present invention as opposed to conventional hydrogen purification processes.

FIGURE 3 dramatically illustrates the effect on the capacity decline of the adsorbent using the preferred embodiment of the process of the present invention. In FIGURE 3 the abscissas are the numerical value of the cumulative quantity of hydrocarbon passed through the activated carbon packed adsorption zone in standard cubic feet per pound of activated carbon adsorbent. The ordinates represent the numerical value of the capacity of the activated carbon adsorbent in terms of the percent capacity of fresh adsorbent. The upper curve illustrates the capacity decline of the adsorbent using the preferred embodiment of the process of the present invention while the lower curve is illustrative of the adsorbent capacity decline using the prior art heatless fractionation process.

It may be seen that in the process of the present invention the activated carbon adsorbent has a much lower rate of capacity decline than the prior art process.

The data for FIGURE 3 were obtained with activated carbon adsorbent, an adsorption pressure of 425 p.s.i.g., a desorption pressure of 10 p.s.i.a. and an adsorption temperature of 100° F. The feed composition is 80 mol percent $H_2$, 7 mol percent $C_1$, 5 mol percent $C_2$, 5 mol percent $C_3$, 2 mol percent $C_4$, and about 1% $C_5$ + material. The ration of the volume of purge to the volume of feed was maintained at 1.0.

Thus, it is seen that for a given ratio of the volume of purge to the volume of feed, the capacity decline is less for the preferred embodiment of the present invention than for currently known processes.

TABLE I

*Composition of Vapor in the Pressure Equalization Zone at Various Intermediate Equilibrium Pressures*

| Component | Composition, Mol percent at Intermediate Equilibrium Pressures | | | | | |
|---|---|---|---|---|---|---|
| | Feed | 400 p.s.i.g. | 350 p.s.i.g. | 250 p.s.i.g. | 150 p.s.i.g. | 50 p.s.i.g. |
| $H_2$ | 78.96 | 93.67 | 89.21 | 82.65 | 74.18 | 56.84 |
| $C_1$ | 6.87 | 6.25 | 10.68 | 17.15 | 25.46 | 42.40 |
| $C_2$ | 5.30 | .03 | .03 | .11 | .26 | .69 |
| $C_3$ | 5.60 | | | | | |
| $C_4$ | 2.32 | | | | | |
| $C_5+$ | 0.82 | | | | | |

The data in Table I illustrate the composition of the vapor in the pressure equilization zone at various intermediate equilibrium pressures. The composition of the feed stream into the adsorption zone is indicated in the first column. These data are representative of a hydrogen purification process utilizing the heatless fractionation technique wherein the adsorption pressure is about 400 p.s.i.g., the adsorption temperature is about 80° F., the desorption pressure is about 10 p.s.i.a., the adsorbent is activated carbon and the ratio of the volume of the purge to the volume of the feed is about 1:1. In Table I the composition of the vapor in the pressure equalization zone was determined at the various intermediate equilibrium pressures.

From these data it may be seen that even with an intermediate equilibrium pressure of 50 p.s.i.g. there is essentially no $C_2+$ hydrocarbon compounds in the depressuring vapors from the adsorption zone. The feed stream contains $C_2$, $C_3$, $C_4$ and even significant quantities of $C_5+$ hydrocarbon compounds. The hydrogen product from this process has a composition of 99.0+ mol percent hydrogen. This means that these heavier hydrocarbon compounds are adsorbed on the adsorbent. In order to remove these hydrocarbon compounds from the adsorbent during the desorption portion of the cycle a vapor must be used that has a composition such that the partial pressure of these heavier hydrocarbon compounds in the vapor stream passed through the zone is substantially equal to zero. It will be noted that the vapor stream in the pressure equalization zone has a composition wherein there are essentially no $C_2+$ hydrocarbons present. This vapor stream is used to effectively purge the adsorption zone in order to remove the heavier hydrocarbon compounds adsorbed on the adsorbent therein.

However, this vapor stream does contain significant quantities of methane. It will thus be seen that during the step wherein the vapor stream from the pressure equalization zone is passed back through the adsorption zone essentially no methane will be removed from the adsorbent. This is due to the high partial pressure of methane in the vapor stream passing through the zone. Thus, a purge with substantially pure hydrogen is still required in order to lower the concentration of methane on the adsorbent. However, methane is much more readily desorbable from the adsorbent than are the heavier hydrocarbon compounds.

As a result the depressuring method of the present invention brings about a situation wherein the capacity of the adsorbent is significantly retained at a higher level than with the prior art fractionation processes. For example, the data in FIGURE 3 show that using the preferred embodiment of the present invention a capacity increase of about 10% is obtained with the preferred embodiment of the present invention over that of the prior art process, after 10,000 s.c.f. of hydrocarbon have been passed over 1 pound of adsorbent.

Also, it is to be noted that there are many other ways in which the advantages of the present invention can be utilized. For instance, it is possible in some cases to use the vapor in the pressure equalization zone as product. To increase the purity of the vapor in the pressure equalization zone a smaller heatless fractionator can be used.

Furthermore, looking at the composition of the gas in Table I at the 50 p.s.i.g. intermediate equilibrium pressure level it may be seen that substantially no heavy hydrocarbon compounds are present in this stream. Thus, if this vapor were passed to another small heatless fractionator essentially no capacity loss of the adsorbent would be encountered and significant recoveries of hydrogen could be obtained.

Also, it is anticipated that instead of maintaining the ratio of the volume of purge to the volume of feed at substantially 1.0 as in FIGURE 3 the purge to feed ratio can be decreased thus increasing the recovery of substantially pure hydrogen product. However, in this instance the capacity loss of the adsorbent would be essentially the same as in the prior art heatless fractionation hydrogen purification processes.

Other ways of taking advantage of the basic concept of the present invention will be apparent to those skilled in this particular art. It is, however, to be pointed out that the significant concept is that the vapor in the pressure equalization zone has a composition substantially similar to that of the product stream. It is this that brings about the advantages previously enumerated.

As previously stated, there are heatless fractionation processes known to the art where such a broad range of compounds are not processed as is true of the hydrogen purification process. In these other processes the capacity of the adsorbent does not decline and, therefore, the volume of the purge is diminished. This results in a substantial increase in the recovery of the desired component in the feed. A well-known example is the removal of water from air or inert gas, as practiced in commercial heatless driers. Another is the separation of hydrogen from a feed stream wherein the only impurity is methane.

In the hydrogen purification process there also exists an optimum volume for the pressure equalization zone. With an adsorption pressure of from 400 to 600 p.s.i.g. and a hydrogen concentration in the feed stream of 50 to 85 mol percent, the pressure equalization zone should be sized so that the intermediate equilibrium pressure is from 10 to 60% of the absolute adsorption pressure. The preferred range is from 15 to 30% of the absolute adsorption pressure.

This optimum equilibrium pressure level existing for the heatless fractionation process wherein hydrogen is purified from a stream containing hydrogen and a mixture of hydrocarbon compounds is based on obtaining substantially no $C_2+$ hydrocarbon compounds in the pressure equalization zone. The composition of the vapor in the pressure equalization zone does not differ appreciably from that of the primary effluent. Thus, when the adsorption zone is backwashed with the vapor stream from the pressure equalization zone, the effect is substantially the same as that obtained by purging the adsoption zone with a portion of the primary effluent.

As an example, a vapor feed having the composition given in Table II is processed in a heatless fractionator utilizing the preferred embodiment of the present invention. The adsorption pressure is 430 p.s.i.g. and the temperature is 100° F. The adsorbent is activated carbon. The desorption pressure is 10 p.s.i.a. while the intermediate equilibrium pressure is 80 p.s.i.g. The ratio of the volume of purge to the volume of feed is 1.0

The composition of the vapor that passes into the pressure equalization zone is given in Table II. It may thus be seen that the only two components in this vapor stream are hydrogen and methane. The primary effluent from the adsorption zone is 99.01+ mol percent hydrogen. Thus, the composition of the vapor in the pressure equalization zone is not appreciably different from that of the primary effluent.

TABLE II

| | Composition of Feed Stream Mol Percent | Composition of Vapor in Pressure Equilization Zone Mol Percent |
|---|---|---|
| Hydrogen | 77.3 | 92.1 |
| Methane | 5.5 | 7.9 |
| Ethane | 5.9 | 0 |
| Ethene | Trace | 0 |
| Propane | 7.6 | 0 |
| Propene | .1 | 0 |
| N-Butane | 1.5 | 0 |
| Isobutane | 1.4 | 0 |
| Butenes | Trace | 0 |
| Butadienes | Trace | 0 |
| N-Pentane | .2 | 0 |
| Isopentane | .5 | 0 |
| Pentene | Trace | 0 |
| Hexanes | Trace | 0 |
| Hexene | Trace | 0 |
| Benzene | Trace | 0 |
| Toluene | Trace | 0 |

Another advantage of the preferred embodiment of the present invention is that the vapor remaining in the adsorption zone after depressuring to the pressure equalization zone is rich in the key components. Thus, when the adsorption zone is then depressured to the low desorption pressure, these key components may then be recovered. The $C_3$ and $C_4$ hydrocarbon compounds may be recovered as liquefied petroleum gas, and the $C_5+$ hydrocarbon compounds may be recovered as gasoline components.

In summary, in the preferred embodiment of the present invention, the adsorption zone is depressured from the primary effluent end to a pressure level intermediate the high adsorption pressure and the low desorption pressure by depressuring to a pressure equalization zone. The adsorption zone is then depressured to the low desorption pressure from the feed inlet end. When the low desorption pressure is reached in the adsorption zone, the vapor from the pressure equalization zone is allowed to pass through the adsorption zone from the primary effluent end ot the feed inlet end, thus backwashing the adsorbent at the low desorption pressure.

Having described this invention, what is sought to be protected by Letters Patent is set out in the following claims.

What is claimed is:

1. In a heatless fractionation process wherein a multi-component mixture in the vapor phase is continuously separated into two streams of different physical properties by high pressure adsorption and low pressure desorption, an improved method of depressuring the adsorption zone to the low desorption pressure comprising the steps of expanding the vapor in the adsorption zone by depressuring the zone at the primary effluent end to a pressure intermediate the high adsorption pressure and the low desorption pressure and flowing the expanded vapor through the zone at the low desorption pressure in a flow direction opposite to that of the feed.

2. In a heatless fractionation process wherein a multicomponent mixture in the vapor phase is continuously separated into two streams of different physical properties by high pressure adsorption and low pressure desorption, an improved method of depressuring the adsorption zone to the low desorption pressure comprising the steps of expanding the vapor in the adsorption zone by depressuring the zone at the primary effluent end to a pressure intermediate the high adsorption pressure and the low desorption pressure, depressuring the zone to the low desorption pressure and thereafter flowing the expanded vapor through the zone at the low desorption pressure in a flow direction opposite to that of the feed.

3. In a heatless fractionation process wherein a multi-component mixture in the vapor phase is continuously separated into two streams of different physical properties by high pressure adsorption and low pressure desorption, an improved method of depressuring the adsorption zone to the low desorption pressure comprising the steps of expanding the vapor in the adsorption zone by depressuring the zone at the primary effluent end to a pressure intermediate the high adsorption pressure and the low desorption pressure, depressuring the zone to the low desorption pressure at the feed inlet end, and thereafter flowing the expanded vapor through the zone in a flow direction opposite to that of the feed.

4. In a heatless fractionation process wherein a multi-component mixture in the vapor phase is continuously separated into two streams of different physical properties by high pressure adsorption and low pressure desorption, an improved method of depressuring the adsorption zone to the low desorption pressure comprising the steps of expanding the vapor in the adsorption zone by depressuring the zone at the primary effluent end to a pressure intermediate the high adsorption pressure and the low desorption pressure, isolating the zone from the expanded vapor stream, depressuring the zone to the low desorption pressure at the feed inlet end and thereafter flowing the expanded vapor through the zone in a flow direction opposite to that of the feed.

5. In a process for obtaining substantially pure hydrogen from a vapor stream comprising hydrogen and hydrocarbon compounds by high pressure adsorption and low pressure desorption, wherein the capacity of the adsorbent declines due to the accumulation of the more difficultly desorbable hydrocarbon compounds on the adsorbent, an improved depressuring method to reduce the rate of capacity decline of the adsorbent at a given purge to feed ratio, comprising the steps of expanding the vapor in the adsorption zone by depressuring the zone at the primary effluent end to a pressure intermediate the high adsorption pressure and the low desorption pressure, isolating the zone from the expanded vapor stream, depressuring the zone to the low desorption pressure at the feed inlet end and thereafter flowing the expanded vapor through the zone in a flow direction opposite to that of the feed.

6. The method of claim 5 wherein the pressure intermediate the high adsorption pressure and the low desorption pressure is in the range of from 10 to 60% of the absolute adsorption pressure.

7. In a process for obtaining substantially pure hydrogen from a vapor stream comprising hydrogen and hydrocarbon compounds by high pressure adsorption and low pressure desorption, wherein the capacity of the adsorbent declines due to the accumulation of the more difficulty desorbable hydrocarbon compounds on the adsorbent, an improved depressuring method to increase the recovery of hydrogen from the feed stream at a given adsorbent capacity decline rate, comprising the steps of expanding the vapor in the adsorption zone by depressuring the zone at the primary effluent end to a pressure intermediate the high adsorption pressure and the low desorption pressure, isolating the zone from the expanded vapor stream, depressuring the zone to the low desorption pressure at the feed inlet end and thereafter flowing the expanded vapor through the zone in a flow direction opposite to that of the feed.

8. The method of claim 7 wherein the pressure intermediate the high adsorption pressure and the low desorption pressure is in the range of from 10 to 60% of the absolute adsorption pressure.

9. In a heatless fractionation process wherein a multi-component mixture in the vapor phase is continuously separated into two streams of different physical properties by high pressure adsorption and low pressure desorption and the adsorbent loses capacity due to the accumulation of the more difficultly desorbable constituents in the mixture on the adsorbent, an improved depressuring method to reduce the rate of capacity decline of the adsorbent at a given purge to feed ratio comprising the steps of expanding the vapor in the adsorption zone by depressuring the zone at the primary effluent end to a pressure intermediate the high adsorption pressure and the low desorption pressure and flowing the expanded vapor through the zone at the low desorption pressure in a flow direction opposite to that of the feed.

10. In a heatless fractionation process wherein a multi-component mixture in the vapor phase in continuously separated into two streams of different physical properties by high pressure adsorption and low pressure desorption and the adsorbent loses capacity due to the accumulation of the more difficultly desorbable constituents in the mixture on the absorbent, an improved depressuring method to increase the recovery of the more desirable constituents of the mixture at a given rate of capacity decline comprising the steps of expanding the vapor in the adsorption zone by depressuring the zone at the primary effluent end to a pressure intermediate the high adsorption pressure and the low desorption pressure and flowing the expanded vapor through the zone at the low desorption pressure in a flow direction opposite to that of the feed.

References Cited in the file of this patent

UNITED STATES PATENTS

| | | |
|---|---|---|
| 2,254,799 | Erdmann | Sept. 2, 1941 |
| 2,944,627 | Skarstrom | July 12, 1960 |
| 2,958,714 | Kearby | Nov. 1, 1960 |